Dec. 28, 1965 G. B. FINN, JR., ET AL 3,226,603

HIGH CURRENT RECTIFIER EMPLOYING A PLURALITY OF WAFERS HAVING RESPECTIVE FUSE ELEMENTS

Filed June 5, 1961

INVENTORS
GEORGE B. FINN, JR.
EDWARD J. DIEBOLD
GEORGE J. EANNARINO
DAVID E. COOPER

BY OSTROLENK, FABER, GERB & SOFFEN
ATTORNEYS

United States Patent Office 3,226,603

Patented Dec. 28, 1965

3,226,603

HIGH CURRENT RECTIFIER EMPLOYING A PLURALITY OF WAFERS HAVING RESPECTIVE FUSE ELEMENTS

George B. Finn, Jr., Los Angeles, Edward J. Diebold, Palos Verdes Estates, George J. Eannarino, Los Angeles, and David E. Cooper, Rolling Hills, Calif., assignors to International Rectifier Corporation, El Segundo, Calif., a corporation of California Filed June 5, 1961, Ser. No. 114,871

3 Claims. (Cl. 317—101)

This invention relates to a high current rectifier element assembly and more specifically relates to a unitary high current rectifier assembly composed of a plurality of individual wafers of semiconductor material connected to a common terminal through a conductor which includes a fuse means therein and is an improvement of copending application Serial No. 114,948, filed June 5, 1961 entitled "Large Area Rectifiers" in the name of George B. Finn, Jr. and assigned to the assignee of the present invention.

In the above noted copending application Serial No. 114,948, a novel unitary high current rectifier element is described which is comprised of a plurality of individual semiconductor wafers mounted to a common terminal and assembled within a common housing. Such a rectifier assembly is used in place of a device having a single large wafer of monocrystalline structure having a junction therein to lead to a more reliable manufacturing process.

This is to say, when forming the unitary device of a single large area wafer the device can be appropriately tested only after it is completely assembled at which time it may be found that the wafer is defective. As taught in the above noted copending application Serial No. 114,948 a plurality of relatively small wafers are used in place of the single large wafer where such smaller devices can be manufactured with greater precision and in the event that one is faulty, its effect may not be destructive to the complete device to cause the discarding of the device. Moreover, the individual small units lend themselves to pre-testing prior to assembly.

In accordance with the present invention, such pre-testing is avoided and the existence of faults within any of the individual wafers, which are such as to cause the disabling of the complete device, are eliminated from the system.

More specifically, the individual wafers which are connected to a common conductor through respective conductors and a fuse means is contained within each of the respective conductors. Thus, during test procedures those wafers which fail during the test will carry a sufficiently large current to cause operation of their respective fuses so that the individual wafer will be removed from the system. Moreover, the individual fuses may be contained within a housing having sand therein which will deposit a glassy fulgerite around a fuse which operates so that it will be insulated with respect to the other fuses to prevent accidental short circuiting of the various elements.

Accordingly, a primary object of this invention is to provide a novel unitary high current rectifier element assembly.

Another object of this invention is to provide a unitary rectifier element assembly formed of a plurality of individual relatively small diameter wafers wherein each of the wafers is associated with a fuse means for removing its respective wafer from the system in the event of a failure of the wafer.

Another object of this invention is to provide a diode assembly which lends itself to simplified testing techniques.

Another object of this invention is to provide a novel unitary rectifier assembly wherein faulty portions of the rectifier assembly may be removed therefrom without destroying the unit.

These and other objects of this invention will be apparent from the following description when taken in connection with the drawings in which.

Figures 1, 2, 3, 4, 5, 6:
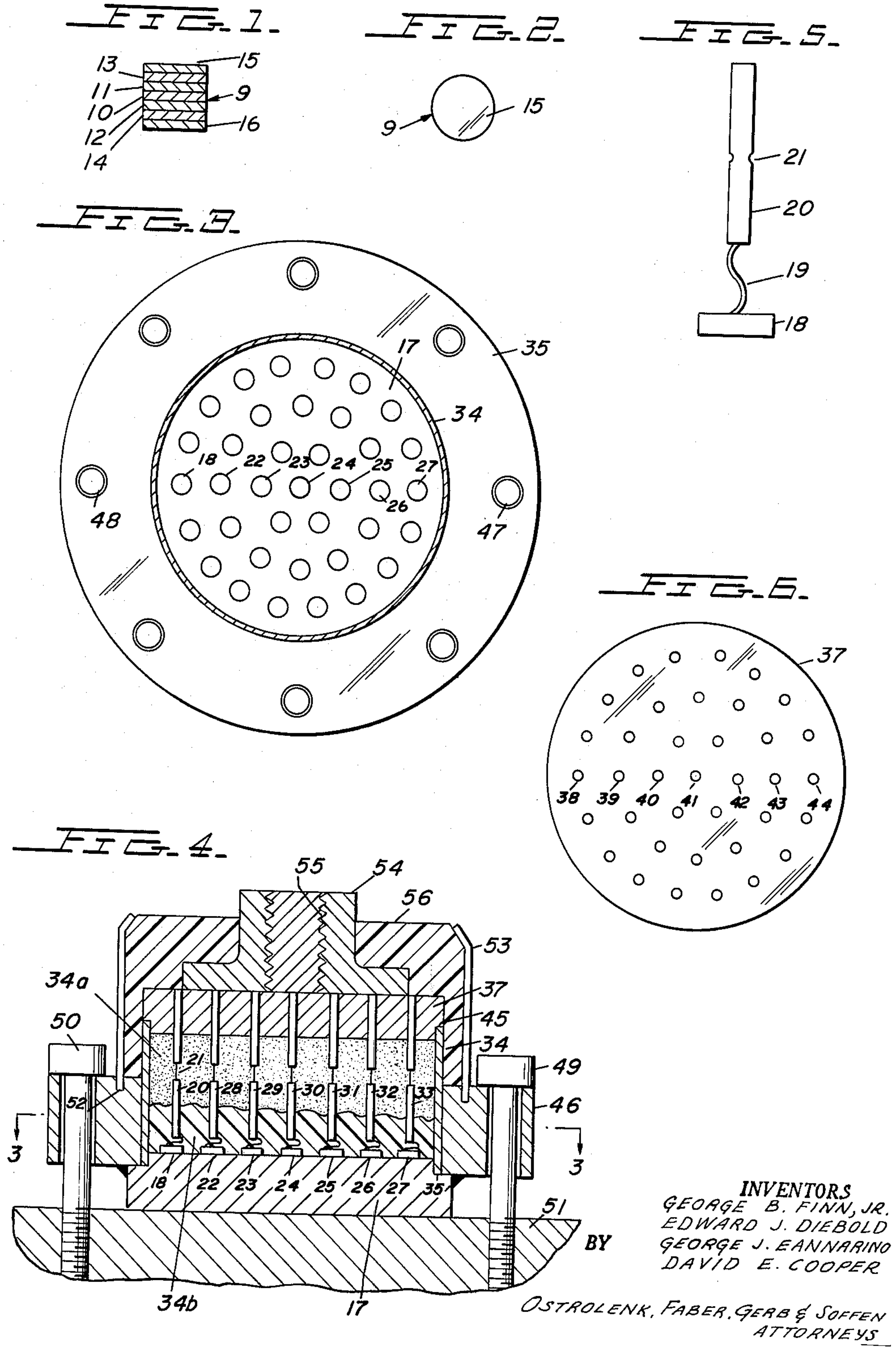
FIGURE 1 shows a cross sectional view of a single wafer of semiconductor material which is to be assembled along with a plurality of other similar wafers into a given rectifier element.
FIGURE 2 is a top view of the wafer of FIGURE 1.
FIGURE 3 is a top cross sectional view of a rectifier element assembly and illustrates the manner in which a plurality of individual wafers are mounted on a common base.
FIGURE 4 is a side cross sectional view of FIGURE 3 taken across the lines 4—4 in FIGURE 3.
FIGURE 5 shows one of the wafers of the assembly of wafers of FIGURES 3 and 4 in connection with its respective fuse link.
FIGURE 6 shows a top view of the top connector plates of FIGURE 4.

As is disclosed in copending application Serial No. 114,948 noted above, a plurality of identical wafers may be assembled into a given rectifier element assembly where each of the identical wafers has the structure shown in FIGURES 1 and 2. Thus the wafer 9 can be formed of a main semiconductor wafer portion 10 which could be of germanium or silicon and has at least one junction therein. The opposite sides of wafer 10 have tin wafer portions 11 and 12 respectively alloyed thereto as described in the above noted application Serial No. 114,948, and adjacent each of tin wafer portions 11 and 12 are tantalum wafer portions 13 and 14 respectively which in turn receive external tin wafer portions 15 and 16 respectively which serve as the terminals for the assembled wafer. While in FIGURE 2 I show the wafer 9 as having a circular area, it will of course be apparent that any desired shape could be used.

In the specific preferred embodiment of the invention described herein the wafer 9 of FIGURE 1 will have an overall thickness of .040 inch, it being understood that the relative thicknesses of the individual wafer portions shown in FIGURE 1 are exaggerated for purposes of clarity. The diameter of the wafer 9 of FIGURES 1 and 2 will be, for example, 5/32 inch.

A plurality of wafers of the type shown in FIGURES 1 and 2 are then, as shown in FIGURES 3 and 4, placed on top of a conductive base 17, which could be of copper, by soldering the tin electrode of each of the wafers which is adjacent, for example, the P-type layer portion of the wafer 10, to the base 17. Such an operation could be performed by holding the plurality of individual wafers (thirty-seven being shown in FIGURES 3 and 4) to the base and thereafter placing the complete assembly in a furnace so that the tin electrodes, such as electrodes 16 of FIGURE 1 of each of the wafers will alloy with the upper surface of copper base 17.

Thereafter, each of the wafers has a lead connected to its upper surface as illustrated in FIGURE 5 for the case of wafer 18 which has the flexible lead 19 secured thereto as by soldering or any other desired method. The upper end of each of the flexible leads, such as flexible lead 19 for wafer 18, is then connected to the lower end of a fuse link such as fuse link 20 which has restricted portion 21 therein at which fusing operation will occur responsive to current flow through link 20 which exceeds some predetermined value. It will be noted in FIGURE 4 that each of wafers 18 and 22 through 27 as well as all of the remaining wafers, will have fuse links such as fuse links 21 for wafer 18, and fuse links 28 through 33 for wafers 22 through 27 respectively. Moreover, each of the fuse links is connected to its responsive wafer through a short flexible lead section so that stress will not be transmitted to the wafer due to dimensional changes of the unit.

After this pre-assembly of the wafers and their respective fuse links, the fuse links are held in relative positions with respect to one another as illustrated, for example, in FIGURE 4 by any appropriate jig means and an insulated ring 34 of any desired material is secured within the annular notch 35 in base 17 as shown in FIGURE 4. The cup-shaped arrangement so defined is then filled with sand **34*a*** to be more fully described which operates in conjunction with each of the individual fuses.

Alternatively, and if it is permissible to lose the effect of the non-stress transmitting conductors such as conductor 19 of fuse link 21, an encapsulating medium **34*b* of any desired insulating material may be poured over the wafers within the cup-shaped arrangement defined by the top surface of base 17 and insulating ring 34 to a level such as that shown which is below the reduced fuse link portion, such as reduced portion 21 of the fuse links. The encapsulating medium can, for example, be of a slurry of any desired insulating material which is cured at an appropriate temperature so that the encapsulating medium hardens to hermetically enclose each of the wafers on base 17 and to secure ring 34 to base 17. Medium 34*b* further acts as a support for each of fuse links 20 and 21 through 33 as well as the remaining fuse links of the system. If desired, medium 34*b* could be flexible after cooling so that, in combination with flexible conductor portions 19**, stress will not be transmitted to the wafers.

Thereafter the jig which holds the fuse links in position during the encapsulating step is removed and the remaining portion of the cup-shaped structure having sides defined by insulating member 34 is filled with a sand **34*a* of a type well known in the art to surround the reduced fuse link portions such as reduced portions 21 of fuse link 20** whereby, when the fuse link operates due to a predetermined excessive current condition and opens at the reduced link portion, the sand will cause a glassy fulgerite to surround the reduced portion as it melts and arcs and aids in extinguishing such arcs. Moreover, the fulgerite will be insulated from adjacent fuse link members.

Next, and as illustrated in FIGURE 6, a top plate 37 having a plurality of openings therein such as openings 38 through 44 which are in registry with fuse links 21 and 28 through 33 respectively as well as other openings in registry with the remaining fuse links of the other wafers is placed on top of insulating cylinder 34 with its annular notch 45 receiving the upper end of cylinder 34 as illustrated. During the assembly of this device it is apparent that the openings in plate 37 receive the upper ends of their respective fuse links as illustrated in FIGURE 4 and the upper ends of these fuse links are secured to plate 33 as by soldering for any other desired electrical securing method.

Thereafter, a steel clamping ring 46 is placed over cylinder 34 and seats on the annular notch 35 in base 17, and is secured to base 17 as by welding or soldering or any other desired manner. Ring 46 as seen in FIGURES 3 and 4 has openings around its periphery such as openings 47 and 48 which can receive bolts such as bolts 49 and 50, respectively of FIGURE 4 which secure the rectifier assembly to a mounting base such as mounting base 51 of FIGURE 4 which has tapped openings therein for receiving the bolts which pass through clamping ring 46.

The clamping ring 46 has an annular notch 52 therein as shown in FIGURE 4 which receives a steel shell 53 which is welded into notch 52 by any usual welding technique or similar fastening method. Thereafter a top connector 53 is electrically secured to the upper surface of disk 37 as by soldering where the top connector 54 has a threaded opening 55 therein adapted to receive a threaded connecting member and serves as the upper electrode of the device.

Finally, an insulating encapsulating medium is poured into shell 53 and is shown as encapsulating insulation 56 in FIGURE 4.

In the device shown in FIGURES 1 through 6 the wafers are of the size set forth in FIGURES 1 and 2 and adjacent wafers are preferably spaced, for example, by the order of 3/32 of an inch to 1/8 of an inch from one another. This will cause thermal coupling between adjacent wafers to cause current balancing between individual wafers as shown in copending application Serial No. 125,311, filed June 5, 1961, entitled "Thermal Coupling of Parallel Connected Semiconductor Elements" in the name of Edward J. Diebold and assigned to the assignee of the present invention. Such a device may have a rating, for example, of 1,000 volts PRV at 500 amperes continuous average rectified D.-C. current and can have a surge capacity of 8,000 amperes for 1/10 of a second.

During operation of the device and in the event that one of the wafers becomes faulty it is possible that such a wafer could operate as a short circuit for the complete unit. In accordance with the present invention, however, when a wafer develops such a fault, such as wafer 18 of FIGURES 4 and 5, the current conducted by its respective fuse link 20 will reach a magnitude such that the restricted portion 21 of the fuse link will melt and separate with a fulgerite being generated from the sand to surround the opened link portion. Thus the faulty wafer 18 is effectively removed from the circuit.

Such an arrangement is highly desirable since it gives a higher yield during manufacturing techniques where it is not possible to pre-test the individual wafers whereby faulty wafers are removed from the system and isolated from the system without destroying the complete system and without unduly reducing the rating of the device.

These advantages continue throughout the life of the device and during its normal operation since if an individual wafer were to develop a fault after a certain length of time it will automatically be removed from the assembly whereby the overall device will have a much longer life and much higher reliability.

In the foregoing, I have described my invention only in connection with preferred embodiments thereof. Many variations and modifications of the principles of my invention within the scope of the description herein are obvious. Accordingly, I prefer to be bound not by the specific disclosure herein, but only by the appending claims.

I claim:

1. A high current rectifier comprising, in combination, a conductive base member, a conductive plate member, an insulating cylinder secured between said conductive plate member and said conductive base member and separating said conductive plate member and said conductive base member from one another, a plurality of wafers having rectifying junctions therein, each of said wafers mounted on said conductive base member and each spaced from one another on said conductive base member, said conductive base member comprising the common terminal of each of said individual wafers, each of said wafers having a lead extending therefrom connected to the surface of said wafers opposite said base member, each of said leads being connected to a respective fuse element, support means for supporting said leads and at least portions of said fuse links in spaced relation with respect to one another and a common arc quenching medium surrounding the exposed portions of each of said fuse members, and hermetic sealing means for hermetically sealing said wafers and said fuse element.

2. The device substantially as set forth in claim 1 wherein said arc quenching medium is comprised of sand.

3. The device substantially as set forth in claim 1 wherein each of said wafers are identical to one another.

References Cited by the Examiner

UNITED STATES PATENTS

| | | | |
|---|---|---|---|
| 2,979,644 | 4/1961 | Salzer | 317—234 |
| 3,110,855 | 11/1963 | Chumakov | 200—120 X |

FOREIGN PATENTS

| | | |
|---|---|---|
| 1,242,208 | 8/1960 | France. |
| 1,071,233 | 12/1959 | Germany. |

JOHN W. HUCKERT, *Primary Examiner.*

JAMES D. KALLAM, *Examiner.*